Patented Dec. 2, 1941

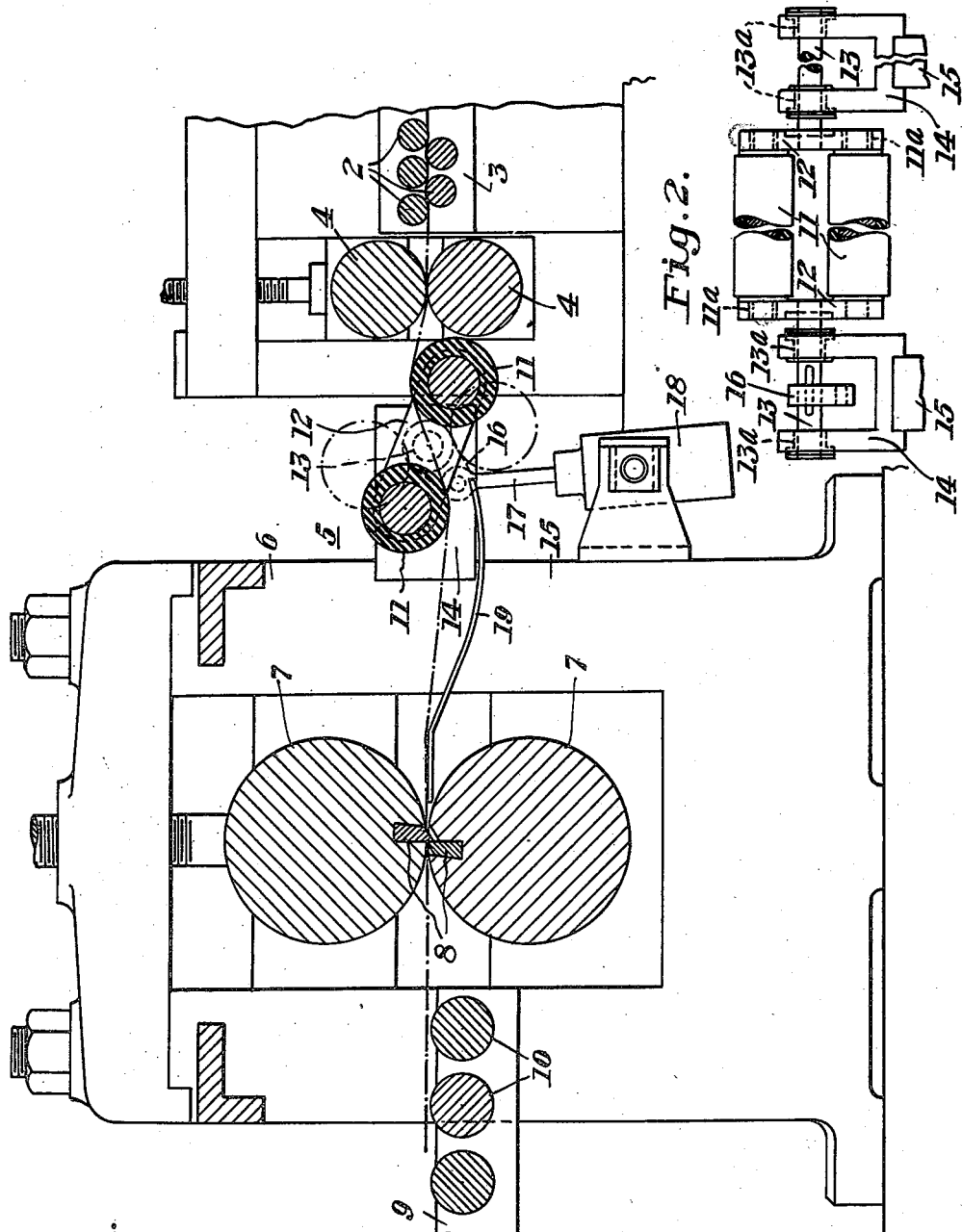

2,264,443

UNITED STATES PATENT OFFICE 2,264,443

STRIP GUIDING APPARATUS

Clarence J. Klein, Hollidays Cove, W. Va.

Application October 18, 1940, Serial No. 361,737

5 Claims. (Cl. 164—68)

The present invention relates to strip guiding apparatus and more particularly to apparatus for guiding strip-like material from one mechanism performing work thereon to another mechanism for performing further work thereon. It is particularly applicable to the guiding of strip from the pinch rolls on the delivery end of a roller leveler to shearing mechanism and it will be described herein as applied thereto. However, it will be understood by those skilled in this art that my invention may be utilized advantageously elsewhere in strip manufacturing and handling operations.

In the manufacture of cold reduced annealed and cold skin rolled tin plate the material in strip form is ordinarily passed through a roller leveler and delivered therefrom by pinch rolls on the delivery end thereof and then passed into a flying shear for shearing the material to appropriate lengths. Heretofore considerable difficulty has been encountered in feeding the strip into the flying shear. In equipment used heretofore the strip has either not been fed properly into the shear or the surface of the relatively soft strip has been marred. This marring or breaking of the surface of the strip is objectionable as it materially increases scrap losses or results in an unsatisfactory product. Furthermore, if the strip is not fed to the shear properly it is not cut accurately to length.

In accordance with the present invention, I provide strip guiding apparatus which can be positioned between the pinch rolls on the delivery end of the roller leveler and the shear and which will properly feed the strip into the shear without marring the surface thereof. The guiding apparatus which I provide is of such character that it can be moved from a position permitting free passage of the strip therethrough to a position where the strip will be properly held and fed forwardly into the shear.

In the accompanying drawing, I have shown for purposes of illustration only a preferred embodiment of my invention when used for guiding the strip between a roller leveler and a flying shear. In the drawing, Figure 1 is longitudinal sectional view of apparatus embodying my invention; and Figure 2 is a plan view of the guiding mechanism shown in Figure 1.

As shown in the drawing, the strip passes between the rolls 2 of the roller leveler 3 and then passes between the pinch rolls 4 on the delivery end of the leveler. The strip then passes through the strip guiding apparatus indicated generally by the reference character 5 and from there is fed forwardly along the pass line to the shearing mechanism 6. The shearing mechanism embodies driven rolls 7 carrying cutting blades 8 thereon, which shear the strip to appropriate lengths. The strip continues forwardly through the shearing mechanism and is discharged therefrom onto a roller table 9 having a plurality of rolls 10 thereon. The roller leveler and the flying shear are shown more or less diagrammatically in the drawing and will not be specifically described herein as they do not per se form a part of the present invention.

The guiding apparatus 5, as stated above, is located between the pinch rolls and the rolls of the shear. It comprises spaced rolls 11 which are provided with relatively soft surfaces such as rubber, so that they will not mar the surface of the strip when in contact therewith or when the strip is being passed therebetween before the rolls are brought into tight engagement with the strip. The rolls 11 are journaled in bearings 11a carried by the bearing members or plates 12. One bearing plate 12 supports one end of each of the rolls and the other bearing plate 12 supports the other end of each roll. Each bearing plate 12 has a shaft or trunnion 13 rigidly secured to it and these trunnions or shafts are journaled in bearings 13a in the parallel, spaced arms of U-shaped brackets or supporting members 14, which are secured to the housing 15 of the shear, the bearing plates 12 being positioned between the brackets or supporting members 14. Between the legs of one of the U-shaped supporting members 14 one of the shafts 13 has keyed to it one end of a crank arm 16. The other end of the crank arm 16 is connected to one end of a piston 17 adapted to be reciprocated by an air cylinder 18.

When in strip engaging position the guiding apparatus is in the position illustrated in solid lines in Figure 1 of the drawing. When in this position the strip is in engagement with both of the guiding rolls and it passes over one roll and beneath the other. When it is desired to pass the leading edge of the strip through the guiding mechanism, air is fed to the cylinder 18 and the plunger or piston 17 is raised. This rotates the shaft 13 and the plates 12 and the rolls carried thereby about the trunnions of the bearing plates 12 and the strip engaging rolls are moved into the position shown in dot and dash lines. As will be readily apparent, in this position the strip can freely pass between the rolls of the guiding mechanism. As soon as the leading edge of the strip has passed between the rolls air is discharged from the cylinder 18 and the piston 17 is lowered and the rolls brought into engagement with the strip.

In order to cause the leading edge of the strip to pass to the throat of the rolls of the shear, a guide plate 19 is positioned beneath the pass line so that when the guide rolls 11 are moved to the position shown in the drawing the leading edge will be forced downwardly into contact with the guide plate 19 and will travel therealong to the throat of the shear.

As stated above, the rolls 11 are provided with surfaces which are softer than the surface of the strip. I have found that in the handling of cold reduced strip rubber surfaces may be satisfactorily utilized on these rolls. By utilizing rolls having such relatively soft surfaces, marring or breaking of the surface of the soft strip is eliminated.

In the embodiment of my invention shown in the drawing, the rotation of the bearing plates and the rolls carried thereby about an axis transversely to the pass line is accomplished by means of an air cylinder and a piston operating therein. However, it will be evident that various other means may be employed for moving the rolls from one position to another. Other mechanical mechanism or electrical mechanism can be utilized for accomplishing this movement of the rolls from one position to the other. In the embodiment shown in the drawing, I have shown an apparatus in which both rolls are moved from one position to another.

While I have shown and described a preferred embodiment of my invention as applied to the guiding of strip between the delivery mechanism of a roller leveler and a flying shear, it will be evident to those skilled in the art that my invention may be applied to various other strip handling operations where it is necessary to guide the strip to work mechanism without any marring of the surface thereof, and also that my invention may be otherwise embodied within the scope of the appended claims.

I claim:

1. The combination with shearing mechanism and a pair of delivery rolls for feeding strip-like material thereto of strip guiding apparatus between said shearing mechanism and said delivery rolls comprising a pair of spaced guide rolls and means for moving the rolls from a position permitting free passage of the strip therebetween to a strip guiding position in which the rolls are in engagement with the strip.

2. The combination with shearing mechanism and a pair of delivery rolls for feeding strip-like material thereto of strip guiding apparatus between said shearing mechanism and said delivery rolls comprising a pair of spaced guide rolls, means for moving the rolls from a position permitting free passage of the strip therebetween to a strip guiding position in which the rolls are in engagement with the strip, and a guide plate adjacent said guide rolls and beneath the pass line between the delivery rolls and the shearing mechanism.

3. The combination with strip delivery apparatus and a rotary shear of strip guiding mechanism comprising a pair of spaced guide rolls having strip engaging surfaces which are soft relative to the strip, means for supporting the rolls between said delivery apparatus and the shear and for maintaining the rolls in spaced relationship, and means for simultaneously moving the rolls about an axis extending transversely of the pass line between the delivery apparatus and the shear for moving the rolls into and out of engagement with the strip.

4. The combination with strip delivery apparatus and a rotary shear of strip guiding mechanism comprising a pair of spaced guide rolls, means for supporting the rolls and for maintaining them in spaced relationship, and means for moving at least one of the rolls about an axis extending transversely of the pass line between the delivery apparatus and the shear to cause both rolls to engage and guide the strip to the shear.

5. Apparatus for handling and shearing strip comprising a rotary shear, means for feeding the strip forwardly into the shear, a pair of spaced guide rolls, means for supporting the rolls and for maintaining them in spaced relationship, and means for moving the rolls about an axis extending transversely of the pass line between the feeding apparatus and the shear to cause the rolls resiliently to engage and guide the strip to the shear.

CLARENCE J. KLEIN.